Patented Dec. 7, 1948

2,455,879

UNITED STATES PATENT OFFICE 2,455,879

ORGANIC LEAD SALT STABILIZERS FOR VINYL HALIDE RESINS

Moyer M. Safford, Schenectady, N. Y., assignor to General Electric Company, a corporation of New York No Drawing. Application May 13, 1946, Serial No. 669,469

10 Claims. (Cl. 260—86)

The present invention relates to vinyl resins and more particularly to vinyl resins stabilized against the action of heat and light and deterioration of electrical properties.

Broadly, my invention relates to the heat and light stabilization of resinous compositions produced by polymerizing compositions comprising a vinyl halide with or without other copolymerizable compounds. Among such compositions are (1) the polyvinyl halides, such as, for example, polyvinyl chloride (including the different molecular weight forms, e. g., gamma-polyvinyl chloride), polyvinyl bromide, etc.; (2) vinyl resins produced by the conjoint polymerization of a vinyl halide, e. g., vinyl chloride, and a vinyl ester of a lower saturated aliphatic monocarboxylic acid, e. g., vinyl acetate (such vinyl chloride-vinyl acetate copolymers being available under the trade name of Vinylite resins wherein the vinyl chloride component is present in a preponderant amount), vinyl propionate, vinyl butyrate, vinyl hexoate, vinyl acetobutyrate, vinyl chloroacetate, vinyl chloropropionate, etc., it being obvious from the foregoing examples that the term "lower saturated aliphatic monocarboxylic acid" embraces ones containing at most six carbon atoms; (3) vinyl resins produced by the conjoint polymerization of a vinyl halide and an acrylic compound, e. g., the copolymers of vinyl chloride with, for example, ethyl methacrylate, methyl methacrylate, benzyl or chlorobenzyl acrylate, methyl chloroacrylate, etc.; (4) copolymers of a vinyl halide, e. g., vinyl chloride, and a vinylidene halide, specifically vinylidene chloride; and (5) many other vinyl resin copolymers, such as the copolymers of three-component systems, for example, vinyl chloride, vinyl acetate and ethyl methacrylate, etc. As will be understood by those skilled in the art, other multi-component copolymers may be used, the only requirement being that at least one of the components is a vinyl halide. Further methods of preparation of the vinyl halide resins employed herein and additional examples of vinyl halide copolymers which may be stabilized with these lead salts may be found in, for example, D'Alelio Patents 2,378,753, issued June 19, 1945, and 2,299,740, issued October 27, 1942, both of which are assigned to the same assignee as the present invention.

I have found that the compounds of the class represented by the general formula

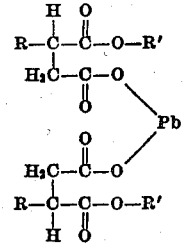

where R is an alkyl radical containing at least 3 and not more than 10 carbon atoms and R' is an alkyl radical containing at least 1 and not more than 5 carbon atoms, are excellent heat and light stabilizers for vinyl halide resins. Illustrative examples of alkyl radicals represented by R are: propyl, butyl, hexyl, isobutyl, isoamyl, 2-ethylhexyl, decyl, etc.; illustrative examples of radicals represented by R' are methyl, ethyl, propyl, butyl, isopropyl, amyl, etc. Preferably R is an alkyl radical containing 10 carbon atoms and R' is a methyl group.

The chemical compounds employed as heat, light and electrical stabilizers for the vinyl resins may be prepared by various methods. One method, as illustrating the preparation of the compound employed in the subsequent examples, comprises first preparing the n-decyl-substituted succinic anhydride derivative having the formula

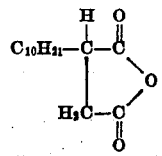

In the preparation of the n-decyl substituted succinic anhydride derivative under discussion, n-decane is caused to condense with maleic anhydride by the method disclosed in Binapfl—U. S. Patent 2,121,183, issued June 21, 1938, which patent teaches that saturated aliphatic hydrocarbons, such as propane, butane, pentane, isopentane, hexane, heptane, octane, etc.; may be condensed with maleic anhydride. The n-decyl-substituted succinic anhydride thus formed is then reacted with an amount of methyl alcohol sufficient to give the half ester of the n-decylsubstituted succinic acid corresponding to the general formula

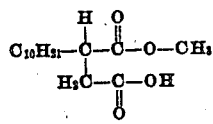

(See the method disclosed by Bone, Sudborough, and Sprankling, Journal of the Chemical Society of London, vol. 85, page 539.) This derivative is in turn heated with PbO at a temperature high enough to effect reaction between the ingredients to yield the compound (or compounds) employed as stabilizers in my invention.

In order that those skilled in the art may better understand how the present invention may be practiced, the following examples are given by way of illustration and not by way of limitation. The resin employed in Example 2 is a copolymer of vinyl chloride and vinyl acetate, the vinyl chloride being present in the polymerizable mixture prior to copolymerization in an amount equal to approximately 85% of the total weight of the monomers.
All parts are by weight.

EXAMPLE 1

| | Parts |
|---|---|
| Polyvinyl chloride | 58 |
| Lead salt of the n-decyl-substituted succinic acid methyl half ester [1] | 2 |
| Tricresyl phosphate (plasticizer) | 40 |

[1] This compound has the structural formula:

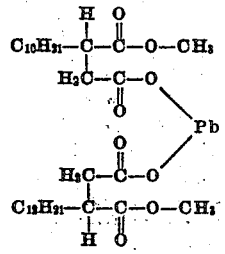

The above components were milled for about 10 minutes on differential rolls, the front roll of which was heated with steam under a pressure of about 20 to 30 pounds per sq. in. The compound after milling was then molded for about 5 minutes at a temperature of 150° C. under a pressure of 500 pounds per sq. in. The sample thereby obtained, which was very pale yellow in color, was divided into several equal parts. Each portion was heat-aged at 150° C. for periods of time varying from 1 minute to 90 minutes, and the effect of this heat-aging noted. As a control, another sample of 60 parts polyvinyl chloride was compounded with 40 parts tricresyl phosphate, omitting the stabilizer in this case. This sample was also pressed under the same conditions disclosed above and divided into equal portions which were heat-aged for the same lengths of time and under the same conditions as those described above for the samples containing the stabilizer. The following tables show the results of these heat-aging tests, as well as the results of the electrical tests conducted at 25° C. It was noted that upon removal of the stabilized and unstabilized samples from the mold, the latter sample was already beginning to turn red, whereas the stabilized sample was almost colorless.

TABLE I

*Stabilized*

| Aging Time at 150° C., Minutes | Dielectric Constant | Power Factor | Loss Factor | Volume Resistivity In Ohms/Cm.$^3$ | Physical Appearance |
|---|---|---|---|---|---|
| 1 | 8.00 | 0.127 | 1.00 | $5.58 \times 10^{11}$ | Very pale yellow. |
| 5 | | | | | Do. |
| 10 | | | | | Do. |
| 15 | | | | | Do. |
| 20 | 8.31 | 0.146 | 1.23 | $3.00 \times 10^{11}$ | Do. |
| 30 | | | | | Light yellow. |
| 60 | | | | | Do. |
| 90 | 8.00 | 0.153 | 1.23 | $3.75 \times 10^{11}$ | Do. |

TABLE II

*Unstabilized*

| Aging Time at 150° C., Minutes | Dielectric Constant | Power Factor | Loss Factor | Volume Resistivity In Ohms/Cm.$^3$ | Physical Appearance |
|---|---|---|---|---|---|
| 1 | 7.8 | 0.148 | 1.2 | $3.12 \times 10^{11}$ | Dark brown. |
| 5 | | | | | Do. |
| 10 | | | | | Do. |
| 15 | | | | | Do. |
| 20 | 9.08 | 0.383 | 3.8 | $1.65 \times 10^{10}$ | Do. |
| 30 | | | | | Very dark brown. |
| 60 | | | | | Do. |
| 90 | 10.57 | 0.550 | 7.0 | $6.50 \times 10^{9}$ | Do. |

EXAMPLE 2

| | Parts |
|---|---|
| Resinous product of copolymerization of a mass consisting, by weight, of 85 per cent vinyl chloride and 15 per cent vinyl acetate | 63 |
| Lead salt of the n-decyl-substituted succinic acid methyl half ester (same as used in Example 1) | 2 |
| Tricresyl phosphate (plasticizer) | 35 |

The above ingredients were compounded on differential rolls and pressed in the same manner as shown in Example 1. Samples of this compound, as well as samples compounded and pressed from the same ingredients from which the stabilizer (the lead salt) was omitted, were heat-aged and tested for their electrical properties in the manner followed in Example 1. The following tables show the results of these tests on the stabilized and unstabilized samples:

TABLE III
Stabilized

| Aging Time at 150° C., Minutes | Dielectric Constant | Power Factor | Loss Factor | Volume Resistivity In Ohms/Cm.³ | Physical Appearance |
|---|---|---|---|---|---|
| 1 | 5.40 | 0.144 | 0.78 | | Light yellow. |
| 5 | | | | | Do. |
| 10 | | | | | Do. |
| 15 | | | | | Do. |
| 30 | 6.30 | 0.158 | 1.00 | | Light amber. |
| 60 | 6.70 | 0.160 | 1.10 | $1.90 \times 10^{12}$ | Do. |
| 90 | 6.52 | 0.166 | 1.10 | $1.99 \times 10^{12}$ | Do. |

TABLE IV
Unstabilized

| Aging Time at 150° C., Minutes | Dielectric Constant | Power Factor | Loss Factor | Volume Resistivity In Ohms/Cm.³ | Physical Appearance |
|---|---|---|---|---|---|
| 1 | 5.23 | 0.158 | 0.835 | | Dark brown. |
| 5 | | | | | Do. |
| 10 | | | | | Do. |
| 15 | | | | | Do. |
| 30 | 6.12 | 0.197 | 1.230 | | Blackish brown. |
| 60 | 6.87 | 0.255 | 1.800 | $8.50 \times 10^{10}$ | Do. |
| 90 | 6.68 | 0.258 | 1.810 | $8.23 \times 10^{10}$ | Do. |

From the foregoing examples it will be apparent that vinyl resins employing the lead stabilizers disclosed previously are able to maintain their light color despite the fact that they were heated at temperatures which caused the unstabilized materials to darken and decompose. Furthermore the electrical properties of the stabilized products were constant over a relatively long period of time at the elevated temperatures employed in the test, while the electrical properties of the unstabilized products, due to their decomposition, increased to such a magnitude as to make them undesirable for use as electrical insulation materials. Since vinyl resins are used extensively as electrical insulation materials, such a defect is quite serious.

Although in the above examples from about 3.2 to 3.5% stabilizer by weight, based on the amount of the vinyl resin, has been employed, I do not intend to be limited to such ranges. Thus, I may use from, for example, about 0.5 to 5% or 10% stabilizer, by weight, based on the amount of the vinyl resin. Although amounts in excess of 10% may be employed, for economical reasons I prefer not to use larger amounts.

It will be understood, of course, by those skilled in the art that my invention is not limited to the stabilization of polymers or copolymers of a vinyl halide with the particular lead salt disclosed in the foregoing examples. Instead of using the stabilizer disclosed above, I may employ other lead salts of the half ester alkyl-substituted succinate having less than 10 carbon atoms in the alkyl radical and more than 1 but less than 5 carbon atoms in the alcohol ester grouping, examples of which are:

Lead salt of monomethyl ester of octyl-substituted succinic acid
Lead salt of monomethyl ester of amyl-substituted succinic acid
Lead salt of monomethyl ester of isobutyl-substituted succinic acid
Lead salt of monomethyl ester of propyl-substituted succinic acid
Lead salt of monoethyl ester of octyl-substituted succinic acid
Lead salt of monoethyl ester of n-decyl-substituted succinic acid
Lead salt of monoethyl ester of neopentyl-substituted succinic acid
Lead salt of monoisopropyl ester of isobutyl-substituted succinic acid
Lead salt of monobutyl ester of n-decyl-substituted succinic acid The above compounds may be readily prepared by the method previously disclosed herein by using the corresponding alkanes in the preparation of the alkyl-substituted succinic anhydride derivative, and thereafter effecting reaction with the desired saturated aliphatic alcohol.

In the compounding of plastic compositions for various uses, there may be included any of the common solvents, plasticizers, e. g., dioctyl phthalate, dibutyl phthalate, etc., pigments and other modifying materials without detrimental effect upon the heat, light, and electrical stability afforded by these new stabilizers.

Various means well known to the art may be used for incorporating the stabilizers of this invention into the resinous compositions. Since the stabilizers used are high-boiling liquids, the resin, plasticizer and stabilizer may be dissolved in a mutual solvent and intimately mixed, followed by the evaporation of the solvent if the composition is not to be used as a varnish. Sheeting on differential rolls, as was used in the examples, may also be employed. It is important to obtain as intimate and complete a dispersion or solution of the stabilizer in the resin as is possible. The usual stabilizers, like PbO (litharge) which are solids, are difficult to disperse. The compounds employed in the practice of this invention are soluble in the plasticizer and hence no difficulty is encountered in its dispersion. Therefore, a more efficient utilization of a given weight of this stabilizer results.

The stabilized vinyl halide polymers and copolymers of this invention may be used not only for compression, extrusion, and injection molding compounds, but also for the preparation of insulated electrical cables either by taping, extrusion, or other methods employed in the art. They also may be employed in the production of varnishes, adhesives, castings, laminated products, etc.

Although in the above examples I have shown copolymers of a vinyl halide containing of the order of 85 per cent vinyl halide, I may use other copolymers in which the vinyl halide is present in lower concentrations, for example, from 40 to 70 per cent, by weight, or higher concentrations, for instance, as high as 98 per cent of the total weight of the copolymerizable materials. For maximum strength and flame-resisting properties, I prefer that the vinyl halide used in preparing the copolymer be present in the copolymer in an amount equal to, by weight, at least 60 per cent, preferably 80 per cent, of the total weight of the copolymerizable ingredients.

It will be apparent that the compounds employed as stabilizers in my invention may also be used to stabilize other halogen-containing resinous and rubber-like products, for instance, polyvinylidene halides and copolymers thereof (e. g., polyvinylidene chloride and copolymers thereof), neoprene, and the like, where free hydrogen chloride may be liberated in the product under the influence of heat-aging.

What I claim as new and desire to secure by Letters Patent of the United States is:

1. A composition comprising (1) a vinyl halide resin and (2) from 0.5 to 10 per cent, by weight, based on the weight of (1) of a heat, light and electrical stabilizer therefor comprising a compound having the general formula

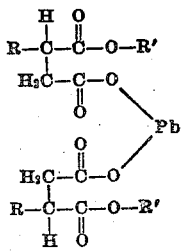

wherein R and R' are each an alkyl radical, the former having from 3 to 10 carbon atoms and the latter having from 1 to 5 carbon atoms in the radical.

2. A composition as in claim 1 wherein R is an alkyl radical having ten carbon atoms.

3. A composition comprising a polymeric mass including (1) polyvinyl chloride and, as a heat and light stabilizer therefor, (2) from 0.5 to 10 percent, by weight, based on the weight of (1) of a compound having the same formula as set forth under (2) of claim 1.

4. A composition comprising (1) the product of conjoint polymerization of a mixture containing a vinyl halide and a polymerizable vinyl ester of a lower saturated aliphatic monocarboxylic acid containing at most six carbon atoms and (2) from 0.5 to 10 per cent, by weight, based on the weight of (1) of a heat and light stabilizer therefor comprising a compound having the same formula as set forth under (2) of claim 1.

5. A composition as in claim 4 wherein the vinyl ester is vinyl acetate.

6. A composition as in claim 4 wherein the vinyl halide is vinyl chloride.

7. A composition comprising (1) a vinyl halide resin and (2) from 0.5 to 10 per cent, by weight, based on the weight of (1) of a heat, light, and electrical stabilizer for (1) comprising a compound having the general formula

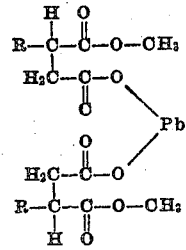

where R is an alkyl radical containing from 3 to 10 carbon atoms.

8. A composition comprising (1) a copolymer obtained by the conjoint polymerization of a mixture comprising, by weight, a major portion of a vinyl halide and a minor portion of a vinyl ester of a lower saturated aliphatic monocarboxylic acid containing at most six carbon atoms, and (2) from 0.5 to 10 per cent, by weight, based on the weight of (1) of a compound represented by the formula

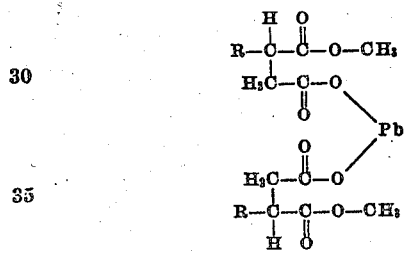

where R is an alkyl radical containing from 3 to 10 carbon atoms.

9. A composition comprising (1) a copolymer obtained by conjoint polymerization of a mixture comprising, by weight, a major portion of vinyl chloride and a minor portion of vinyl acetate, and (2) from 0.5 to 10 per cent, by weight, based on the weight of (1) of a compound represented by the formula

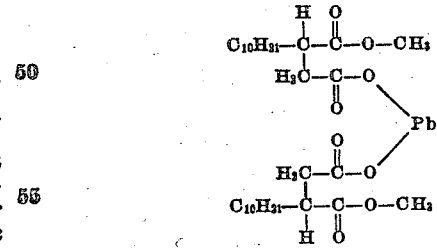

10. A composition comprising (1) polyvinyl chloride and (2) from 0.5 to 5 per cent, by weight, based on the weight of (1) of a heat, light, and electrical stabilizer for (1) containing a compound having the same formula as set forth under (2) of claim 9.

MOYER M. SAFFORD.

No references cited.